March 4, 1969  R. J. GANNON, JR  3,430,970
MULTIFORM CHUCK
Filed April 16, 1965
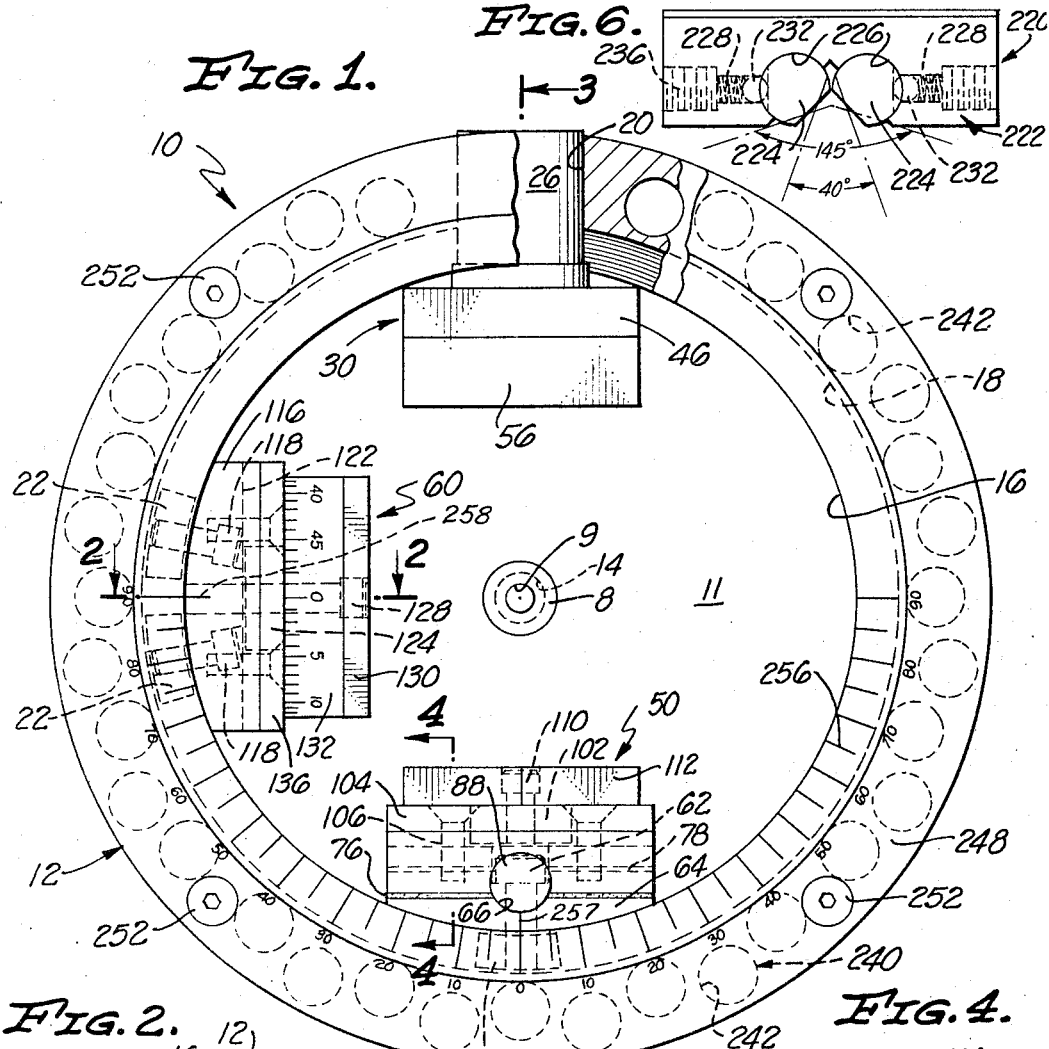
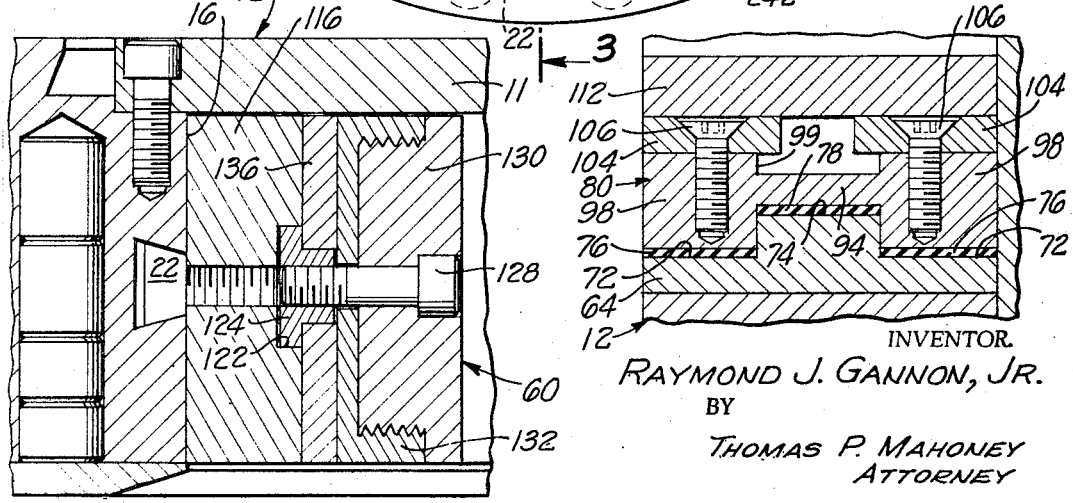
INVENTOR.
RAYMOND J. GANNON, JR.
BY
THOMAS P. MAHONEY
ATTORNEY

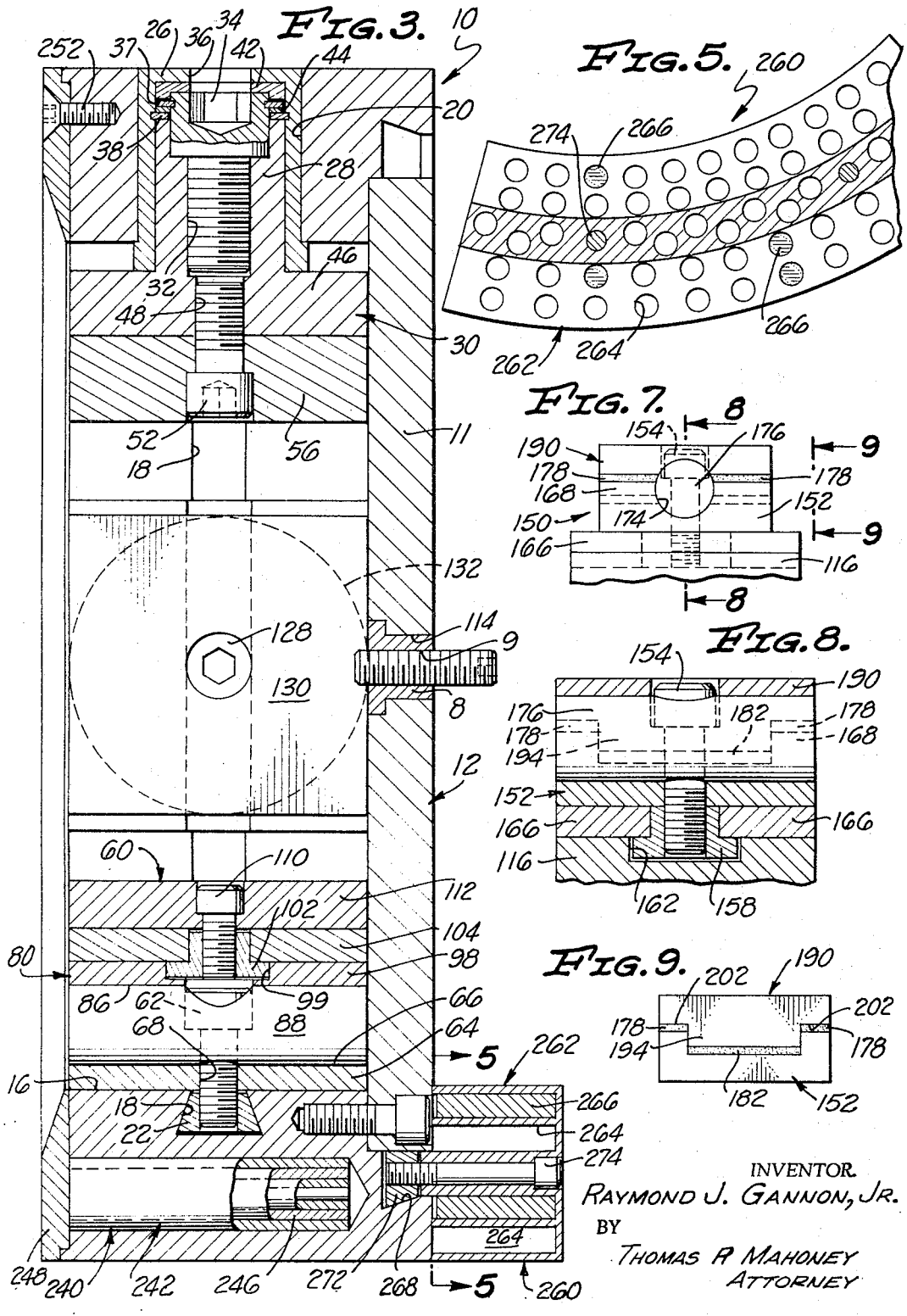

March 4, 1969 R. J. GANNON, JR 3,430,970
MULTIFORM CHUCK
Filed April 16, 1965 Sheet 3 of 3
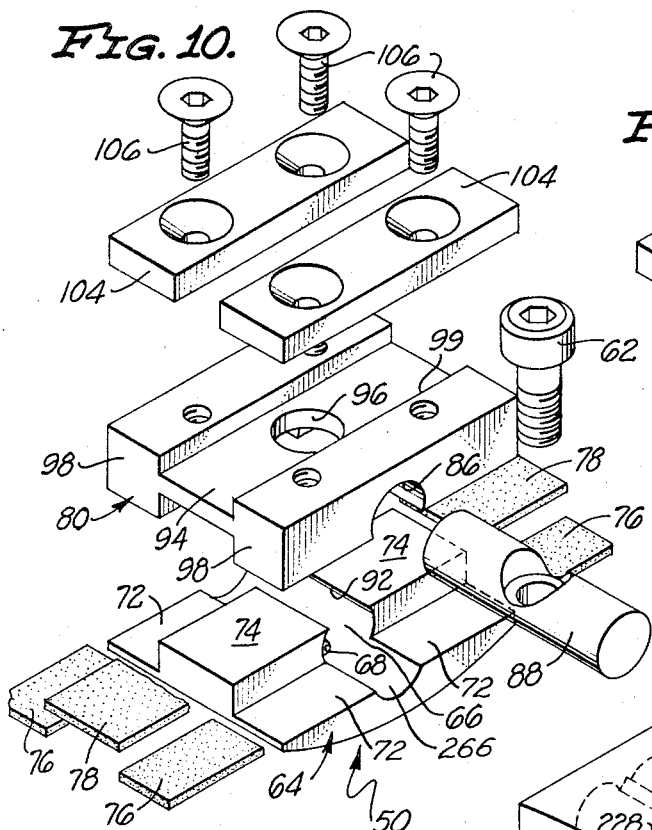
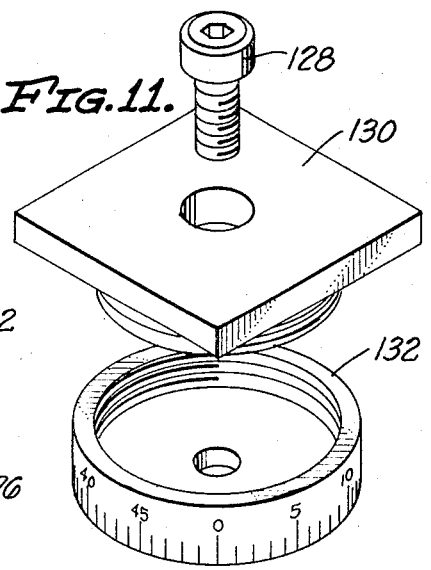
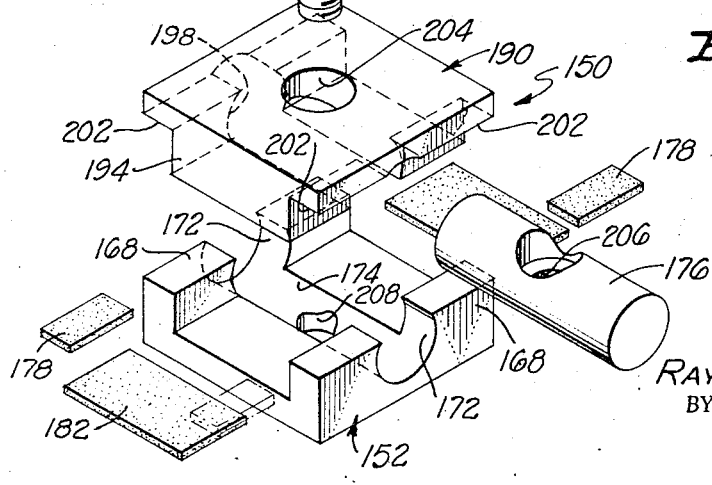
INVENTOR.
RAYMOND J. GANNON, JR.
BY
THOMAS P. MAHONEY
ATTORNEY

United States Patent Office 3,430,970
Patented Mar. 4, 1969

3,430,970
MULTIFORM CHUCK
Raymond J. Gannon, Jr., 6753 W. 86th Place,
Los Angeles, Calif. 90045
Filed Apr. 16, 1965, Ser. No. 448,748
U.S. Cl. 279—112    20 Claims
Int. Cl. B23b 31/16, 5/22; B25b 1/02

ABSTRACT OF THE DISCLOSURE

A tubular chuck having jaw mounting means in the bore, adjustable in angular, chordal, radial and axial directions to rigidly retain workpieces of any configuration in any position, eccentric or concentric to the axis of the bore.

---

This invention relates to a chuck particularly adapted for utilization in conjunction with machine tools having a rotatable drive member for receiving a chuck, such as a lathe, or with the bed of such machine tools as milling machines, grinders, and the like.

The chuck of my invention is particularly designed to permit the formation of eccentrically positioned openings in a workpiece or, conversely, to permit approximately concentric openings to be formed in a workpiece. The chuck of the invention is particularly adapted for utilization in forming bores, projections, or other openings in irregularly shaped bodies which cannot ordinarily be adequately handled in a conventional chucking means as provided on lathes and similar machine tools.

As is well known to those skilled in the art, the repetitious generation of projections, openings or bores in irregularly shaped objects or the generation of openings or bores which are eccentrically located in regularly shaped objects or workpieces where the workpiece is rotated with respect to the tool, or where the tool is rotated with respect to the workpiece, entails the utilization of special tooling since it is not practical by the use of conventional chucks to mount the workpiece in such a manner that the opening or bore can be formed on the central axis of a conventional chuck.

It is, therefore, an object of my invention to provide a chuck which is adapted to be utilized in conjunction with a lathe or similar machine tool which is particularly adapted for the generation of eccentrically positioned projections, openings or bores in symmetrically shaped workpieces or which is adapted to form openings or bores in asymmetrical workpieces.

Conventional chucks customarily include a plurality of jaws which are simultaneously actuated to grip a symmetrically shaped object in order that an opening or bore or cut may be made in or upon the workpiece. Since the jaws of conventional chucks are displaced identical distances toward or away from the central axis of the chuck to accomplish mounting of the workpiece, it is obvious that an opening eccentric with the configuration of a symmetrically formed workpiece cannot be generated by the use of such a conventional chuck and that an opening approximately concentric with an asymmetrically shaped workpiece cannot be formed by such a conventional chuck.

Another object of my invention is the provision of a chuck which includes a body and which has a plurality of jaws mounted thereupon having workpiece engaging surfaces. In contradistinction to conventional chucks, at least one of the jaws and preferably two, can be moved circumferentially of the body of the chuck in order to locate said one jaw in a desired location with respect to the circumference of said body.

Therefore, if a workpiece of non-uniform external configuration is to be mounted in the chuck of the invention, at least one and, preferably two, of the chuck jaws may be shifted to orient the work-engaging surface or surfaces thereof into the position or positions in which the external surfaces of the workpiece will be most effectively engaged.

A natural consequence of the facility with which the selected jaw may be moved circumferentially of the body of the chuck is that the chuck will accommodate an almost unlimited variety of workpieces having asymmetrical external configurations and will, further, permit eccentrically positioned openings, bores, or surfaces to be generated in or upon symmetrically configured workpieces.

An inherent characteristic of an asymmetrically configured workpiece or a symmetrically configured workpiece which is to be located eccentrically of the chuck body is that, when located in the body, one or more surfaces thereof will be located different distances from the perimeter of the body.

Another object of my invention is the provision of a chuck of the aforementioned character which incorporates a plurality of chuck jaws, at least one of which, and preferably, more than one, incorporates means for determining the spatial relationship of its associated work-engaging surface in respect to the center of the chuck body.

Consequently, when the workpiece is located in the body, the work-engaging surfaces of one or more of the chuck jaws can be adjusted angularly of the body to cause said work-engaging surface of said jaws to be moved into engagement with the contiguous surface of the workpiece.

An associated object of my invention is the provision of means for determining the aforesaid spatial relationship which includes a micrometer adjustment whereby the work-engaging surface of the associated jaw may be micrometrically adjusted into engagement with the corresponding surface of the workpiece.

Another object of my invention is the provision of means adapted to establish the aforesaid spatial relationship including a gauge block of a predetermined thickness which can be selected and mounted in operative relationship with the associated chuck jaw and can serve as the work-engaging surface thereof.

Another object of my invention is the provision of a chuck of the aforementioned character wherein at least one, and, preferably, more than one, of the chuck jaws, incorporates adjustment means which can be readily actuated to permit the relatively free movement of the associated chuck jaw in an arcuate or circumferential and chordal path on the chuck body to accomplish the precise location of the associated chuck jaw in a desired orientation with respect to the chuck body and the workpiece being mounted in the chuck body.

Occasionally, a workpiece is encountered whose external configuration is so asymmetrical that it is not feasible to locate the work-engaging surface of an associated chuck jaw into precise alignment with the contiguous surface of the workpiece.

It is, therefore, an object of my invention to provide a chuck of the aforementioned character which includes at least one chuck jaw which incorporates pivotal means adapted to facilitate the deflection of the work-engaging surface of the associated jaw so that variations in said surface may be accommodated while still securing the workpiece firmly in operative relationship with said jaw.

One of the problems which is encountered in the mounting of eccentrically configured workpieces for rotation about a central axis and which is also inherent in the eccentric positioning of symmetrically shaped bodies is the resultant imbalance which is encountered as the chuck is rotated to cause the associated tool to generate the desired surface, bore or opening.

A further object of my invention is the provision of a chuck of the aforementioned character which includes balancing means of an adjustable nature which is adapted to permit the chuck to be balanced after the workpiece has been mounted therein. Consequently, lateral displacement of the chuck attributable to the imbalance created by the workpiece is eliminated. Since the static balancing means is adjustable, it can be accommodated to any desired situation.

A further object of my invention is the provision of a chuck jaw working surface incorporating angularly adjustable elements for receiving angular surfaces on a workpiece.

Other objects and advantages of the invention will be apparent from the following specification and the accompanying drawings, which are for the purpose of illustration only, and in which:

FIG. 1 is a front elevational view of a chuck constructed in accordance with the teachings of my invention;

FIG. 2 is an enlarged, fragmentary sectional view taken on the broken line 2—2 of FIG. 1;

FIG. 3 is an enlarged, vertical sectional view taken on the broken line 3—3 of FIG. 1;

FIG. 4 is an enlarged, vertical fragmentary sectional view taken on the broken line 4—4 of FIG. 1;

FIG. 5 is a vertical, sectional view taken on the broken line 5—5 of FIG. 3;

FIG. 6 is an end elevational view of a chuck jaw adapted to be utilized in conjunction with the chuck of the invention;

FIG. 7 is an end elevational view of a jaw constructed in accordance with the teachings of the invention;

FIG. 8 is a vertical sectional view taken on the broken line 8—8 of FIG. 7;

FIG. 9 is a side elevational view taken on the broken line 9—9 of FIG. 7;

FIG. 10 is an exploded view showing the components of the jaw illustrated in FIG. 4;

FIG. 11 is an exploded view showing the components of the micrometrically adjustable jaw;

FIG. 12 is an exploded view showing the components of the jaw shown in FIGS. 7 and 8; and FIG. 13 is an exploded view showing the components of the jaw illustrated in FIG. 6.

Referring to the drawings and particularly to FIGS. 1–4 thereof, I show a chuck or ring vise 10 constructed in accordance with the teachings of my invention, and including a substantially cylindrical body 12. As previously indicated, the teachings of my invention are applicable with equal facility to rotatable chucks or a stationary vise. For instance, when the teachings are applied, as in the present disclosure, to a chuck, the body 12 may be mounted by suitable means, not shown, to the spindle of a lathe or similar machine tools having means for the reception of a conventional chuck. Conversely, when the teachings are incorporated in a stationary vise construction, the vise is secured to the bed of a machine tool, such as a milling machine, and the workpiece is maintained in a stationary condition.

For purposes of convenience, as previously indicated, a mounting plate 11 on the body 12 of the chuck 10 incorporates a centrally located opening 14 which is machined concentric to the inner wall 16 of the body 12 so that a dial indicator may be used to sweep the opening to locate the chuck 10 concentric to the spindle of a machine to which it is attached. The opening 14 receives the spindle of a balancing machine used to balance the chuck 10 and workpiece mounted therein. The opening 14 will also receive a cylindrical plug 8 with a threaded bore 9 for a screw that adjusts axially as an adjustable back stop for the workpiece in the chuck.

The inner wall or bore 16 of the body 12 incorporates way means constituted by the annular surface of said wall and an annular dovetail groove 18, FIG. 3, is formed in said way means to facilitate the attachment to said body of a variety of chuck jaws adapted for utilization in conjunction therewith.

The chuck 10 is particularly designed to accommodate workpieces having asymmetrical external configurations in order that substantially concentric bores, surfaces, projections or openings may be formed therein or, conversely, to accommodate eccentrically positioned workpieces having symmetrical external configurations to facilitate the generation of eccentric bores, openings, projections and surfaces upon said workpieces.

To facilitate the consideration of the teachings of the invention, the assembly pattern followed in assembling the chuck 10 and its components, as shown in FIGS. 1–4 of the drawings, will be followed. A large radial bore 20 extends through the annular wall of the cylindrical body 12 and communicates with the dovetail groove 18. Therefore, dovetail nuts 22 constituting a part of the attachment means for the various movable jaws utilized in conjunction with the body 12 may be inserted through the bore 20 and located in the annular dovetail groove 18.

After the dovetail nuts 22 are located in the corresponding groove 18, a bushing 26 is placed into the bore 20, said bushing receiving the cylindrical shank 28, FIG. 3, of a radially adjustable jaw 30 which is fixed against circumferential movement relative to the body 12 of the chuck 10, but which can be adjusted radially toward or away from the center of the body 12, in a manner to be described in greater detail hereinbelow.

Mounted in a threaded bore 32 in the cylindrical shank 28 of the radially adjustable jaw 30 is an adjustment bolt 34 whose head is accessible through a corresponding orifice 36 in the bushing or housing 26, so that it may be rotated to cause corresponding radial extension or retraction of the cylindrical shank 28 into or from the bushing 26. The adjustment bolt 34 is maintained in operative relationship with the bushing 26 by retaining rings 37 and 38, FIG. 3, and associated washers 42 and 44.

Also incorporated in the square head 46 of the radially adjustable jaw 30 is a threaded bore 48 adapted to receive a securement bolt 52 which secures a work-engaging spacer or gauge block 56 in operative engagement with the square head 46 of the radially adjustable jaw 30. The gauge or spacer block 56 can be of any desired thickness and, thus, two criteria of the extent to which the radially adjustable jaw 30 may be advanced toward the center of the body 12 are the thickness of the block 56 and the extent to which the adjustment bolt 34 will advance the radially adjustable jaw 30 toward the center of the body 12.

Operatively associated with the radially adjustable jaw 30 are angularly and radially adjustable jaws 50 and 60. The work-engaging surfaces of the jaws 50 and 60 are also chordally adjustable. The circumferentially or angularly and radially adjustable jaw 50 is secured in operative relationship with the way means constituted by the inner wall 16 of the body 12 by adjustable mounting means, including the adjustable dovetail nuts 22 and dovetail groove 18 and a cooperative securement bolt 62 which has its lower extremity engaged in the correspondingly threaded bore of the associated nut 22.

The adjustable jaw 50, as best shown in FIGS. 1, 3–4, and 10 of the drawings, includes a carriage shoe 64 engraved with a radial index line 257 lying perpendicular to surface 76 for alignment with index graduations 256 whose bottom surface is formed on the same radius as the way means, said carriage plate having an arcuate, transverse groove 66 formed therein and intersected by a centrally located opening 68, which permits the passage of the adjustment bolt 62.

Formed upon the opposite extremities of the carriage shoe 64 are lateral surfaces 72 and central surfaces 74 adapted to receive resilient pads 76 and 78, respectively, for a purpose to be described in greater detail hereinbelow.

Disposed in overlying relationship with the carriage shoe 64 is a retainer plate 80, said plate having side portions 98 which form a transversely oriented, over semicylindrical groove 86 corresponding to the over semicylindrical intermediate portion 92 of groove 66 in the carriage shoe 64. The outer portions 266 of the groove 66 are under semi-cylindrical. The intermediate portion of groove 86 formed by the underside of web 94 is under semi-cylindrical. A cylindrical pin or key 88 engages the transverse groove 86 and the upper portion 92 of the groove 66.

To more fully explain the manner in which the pin 88 serves to maintain the carriage shoe 64 and the retaining plate 80 in operative relationship, it should be pointed out that the intermediate portion of groove 66 in the carriage shoe 64 is formed on an arc of approximately 240°. The groove 86 is constituted by two parts on each side of the retaining plate 80 formed on arcs greater than 180° and, thus, the pin 88 serves to secure the retaining plate 80 in operative relationship with the carriage shoe 64.

The retaining plate 80 is provided with a relatively thin, central web 94 incorporating an opening 96 and relatively large side portions 98. The web 94 engages the upper surfaces of the resilient pads 78 and retains them in operative relationship with the adjacent surfaces 74 of the carriage shoe 64, while the under surfaces of the side portions 98 engage the upper surfaces of the resilient pads 76 to maintain them in operative relationship with the adjacent surfaces 72 of the carriage plate 64.

The web 94 of the retaining plate 80, in conjunction with the side portions 98, defines a groove 99 for the reception of the head of a flange nut 102, which is secured in operative relationship with the groove 99 by means of overlying retainer strips 104 secured in operative relationship with the retaining plate 80 by means of screws 106.

A fastening bolt 110 is adapted to maintain a spacer or gauge block 112, FIGS. 1 and 3, in operative relationship with the remainder of the jaw 50.

The incorporation of the resilient pads 76 and 78 in the circumferentially adjustable jaw 50 permits the workpiece engaging surface of the jaw 50 constituted by the upper surface of the gauge or spacer block 112 to compensate for minor angular variations in the contiguous surface of the workpiece and, thus, insures that the maximum engagement of the workpiece surface by the workpiece engaging surface of the jaw 50 will be accomplished.

Furthermore, the jaw 50 can be angularly or circumferentially moved with reference to the way means constituted by the inner wall 16 of the body 12 by releasing the securement bolt 62 sufficiently to free the dovetail nut 22 in the dovetail groove 18. When the desired orientation of the jaw 50 on the way means has been achieved, the securement bolt 62 can be tightened to locate the jaw 50 in the desired position. The spacer block 112 can be adjusted along the chord of the jaw 50 also.

The gauge or spacer block 112 can, of course, be excharged for a thinner or thicker block to adjust the spatial relationship of the workpiece engaging surface of the jaw 50 with respect to the axis of the chuck 10. In addition, a micrometrically adjustable spacer block 130 and adjustment collar 132 may be substituted for the gauge block 112 while still incorporating the compensating features of the jaw 50.

The micrometrically and angularly adjustable jaw 60, as best shown in FIGS. 1–3 and 11 of the drawings, includes a carriage shoe 116 operatively secured by adjustable mounting means consisting of securement bolts 118 and the dovetail nuts 22, to the way means constituted by the inner wall 16 of the body 12. A T-slot 122 is formed in the outer face of the carriage shoe 116, and has a T-nut 124 located therein engageable by a bolt 128. The head of the bolt 128 secures a micrometrically adjustable spacer block 130 in operative relationship with an adjustment collar 132, which is positioned for rotation on spacer strips 136. Therefore, in addition to being circumferentially and angularly adjustable on the way means of the body 12 by the loosening of the bolts 118, the work-engaging surface of the micrometrically adjustable spacer block 130 can be radially adjusted inwardly or outwardly by rotation of the collar 132 after the fastening bolt 128 has been loosened to permit free rotation of the collar 132. Loosening of the bolt 128 also permits side or chordal adjustment.

An alternative form of compensating jaw functions in a manner analogous to the compensating jaw 50, as shown in FIGS. 7–9 and 12 of the drawings. The compensating jaw 150 includes a base 152 adapted to be secured to a carriage shoe, such as the carriage shoe 116, by a fastening bolt 154 engageable in a T-nut 158 located in a groove 162 provided in the upper surface of the carriage shoe 116 by means of retainer strips 166. The base 152 includes upstanding portions 168 incorpating the terminal over semi-cylindrical extremities 172 of a transverse groove 174. The terminal extremities 172 of the groove 174 are formed on an arc greater than 180° to secure the extremities of a cylindrical pin or key 176 in operative relationship therewith. The upper surfaces of the upstanding portions 168 are adapted to receive resilient pads 178, and larger pads 182 are received on the upper surface of the base 152 between said upstanding portions.

A spacer block 190 is mounted on the base 152 and incorporates on its underside opposed, rectangular bosses 194 which fit between the upstanding portions 168 of the base 152 and engage the pads 182. The confronting inner surfaces of the bosses 194 define an over semi-cylindrical groove 198 formed on an arc of approximately 240° to encompass the contiguous area of the pin 176 and, thus, to retain the spacer block 190 in operative relationship with the base 152. It will be noted that the construction is similar to that shown in FIG. 10. The under surface 202 of the lateral edges of the spacer block 190 are adapted to engage the upper surfaces of the pads 178 to retain them in operative relationship with the upper surfaces of the upstanding portions 168 of the base 152.

The spacer block 190, the pin 176, and the base 152 are provided with coincident bores 204, 206 and 208, respectively, as best shown in FIG. 12, to permit the passage of the shank of the securement bolt 154 therethrough in order that the shank of the securement bolt 154 may engage the corresponding threaded bore of the T-nut 158.

The compensating jaw 150 will permit the work engaging surface of the spacer block 190 to be deflected about the axis of the pin 176 to accommodate irregularities in the contiguous surface of the workpiece.

Shown in FIGS. 6 and 13 of the drawings, is another type of compensating jaw for utilization in conjunction with workpieces having surfaces of different angularities formed thereupon. The compensating jaw 220 includes a body 222 having a workpiece engaging portion thereupon.

Mounted in the body 222 of the jaw 220 is a pair of over semi-cylindrical work engaging elements 224 which are rotatable in over semi-cylindrical bores 226 formed on arcs greater than 180°. The body 222 of the jaw 220 has oppositely oriented bores 228 therein for the reception of spring-biased ball detents 232 which engage in corresponding grooves 234 formed in the work engaging elements 224 to limit the rotation and axial movement thereof. The bores 228 are counterbored at their outer extremities to receive retaining set screws 236.

Therefore, when a workpiece having an angular surface is to be mounted in the chuck 10, a compensating jaw 220 can be installed in overlying relationship with the work engaging surface of the jaw 30. The upper surface 223 of the body 222, as best shown in FIG. 13 of the drawings, is slightly arcuate so that an additional compensating feature is introduced into the compensating jaw 220.

When the angular surface of the workpiece engages the flat surfaces on the semi-cylindrical work engaging elements 224, they are automatically rotated to bring the flat surfaces into complete engagement with the correspondingly angular surfaces on the workpiece.

Because the unequal distribution of the weight of the workpiece and the unequal distribution of the jaws will unbalance the body 12 of the chuck 10 when it is mounted for rotation in a lathe or similar machine tool, I have provided two forms of balancing means whereby the chuck 10 may be dynamically balanced. The first balancing means 240 consists of a plurality of interspersed bores 242 adapted to receive solid cylindrical weights or internested tubular weights 246, as best shown in FIGS. 1–3 of the drawings.

The balancing weights are retained in operative relationship with the bores 242 by an annulus 248 which, as best shown in FIGS. 1 and 3 of the drawings, is retained in operative relationship with the body 12 by screws 252. The annulus 248 is provided with graduations indicated at 256 to permit the circumferentially adjustable jaws to be arcuately located in a desired location on the body 12.

The second dynamic balancing means 260 is constituted by a body 262 in the form of a sector of a circle. The body 262 incorporates a plurality of bores 264 adapted to receive cylindrical or tubular weights 266. An arcuate key way 268 is formed in the body 12 of the chuck 10 and the body 262 is secured in operative relationship therewith by means of a nut 272 and bolt 274.

I thus provide by my invention a radial chuck or vise characterized by the facility with which articles of irregular shape or contour may be accommodated and regularly shaped articles may be eccentrically positioned.

The angularly adjustable jaws of the invention and the compensating features incorporated therein permit almost every conceivable contingency to be successfully confronted.

In applications where the invention is applied in a rotatable chuck, the provision of dynamic balancing means eliminates the unbalanced weight conditions which would otherwise result from the inherent imbalance introduced into the chuck by the adjusting of the jaws and the eccentric positioning of the workpiece.

Although the invention has been herein shown and described in what are conceived to be the most practical and preferred embodiments thereof, it is recognized that departures may be made therefrom within the scope of the invention, which is not to be limited to the details disclosed herein, but is to be accorded the full scope of the claims so as to embrace any and all equivalent structures and devices.

I claim:

1. In a chuck, the combination of: a tubular body having in its bore way means thereupon for the reception of a plurality of chuck jaws; a plurality of chuck jaws operatively connected to said body; and adjustable mounting means for at least one of said jaws operatively connected to said way means to permit arcuate adjustment of said one jaw with respect to the other jaws.

2. In a chuck for use in conjunction with a lathe or similar machine tool, the combination of: a tubular body having in its bore chuck jaw receiving way means thereupon; chuck jaw mounting means operatively connected to said body, at least one of said mounting means being adjustably connected with said way means to permit the arcuate movement of the associated chuck jaw with reference to said body; and a plurality of chuck jaws mounted on said mounting means, at least one of said jaws being secured to said adjustably connected mounting means, said chuck jaws having work-engaging surfaces thereupon and at least one of said jaws having means thereupon for determining the location of said associated surface with respect to the center of said body.

3. In a chuck for use in conjunction with a lathe or similar machine tool, the combination of: a tubular body having in its bore chuck jaw-receiving way means; chuck jaw mounting means operatively connected to said body, at least one of said mounting means being adjustably connected with said way means to permit the arcuate movement of the associated chuck jaw with reference to said body; and a plurality of chuck jaws mounted on said mounting means, said chuck jaws having work-engaging surfaces thereupon and at least one of said jaws having means thereupon for determining the location of said associated surface with respect to the center of said body, said determining means being constituted by a micrometer adjustment for moving said surface toward or away from said center.

4. In a chuck for use in conjunction with a machine tool, the combination of: a body securable in operative relationship with said tool, said body having a cupped cavity and an adjustment way in said cavity; chuck jaw mounting means operatively connected to said body, at least one of which is adjustably secured to said way; and a plurality of chuck jaws operatively connected to said mounting means, each of said jaws having a work-engaging surface and at least one of said jaws having means for determining the location of said work-engaging surface with respect to the center of said body.

5. In a chuck for use in conjunction with a machine tool, the combination of: a tubular body securable to said tool, the bore of said body having an adjustment way; chuck jaw mounting means operatively connected to said body, at least one of which is adjustably secured to said way; and a plurality of chuck jaws operatively connected to said mounting means, at least one of said jaws being connected to said adjustable mounting means to permit it to be shifted arcuately on said body, at least one of said jaws having means for determining the location of its work-engaging surface with respect to the center of said body and pivotal means incorporated in one of said jaws to facilitate angular deflection of its work-engaging surface.

6. In a chuck, the combination of: a tubular body having in its bore arcuate way means thereupon for the reception of a plurality of chuck jaws; adjustable mounting means for at least one of said jaws operatively connected to said way means to permit arcuate adjustment of said one jaw with respect to the other jaws; and adjustable balancing means in said body for balancing said body, said balancing means comprising a plurality of cavities in the tubular portion of said body, balancing weights in said cavities, and an annulus on said body for retaining said weights in said cavities after a workpiece has been located in said body by said jaws.

7. In a chuck for use in conjunction with a machine tool, the combination of: a cored body, said body having in its cored cavity, arcuate way means thereupon; chuck jaw mounting means operatively connected to said body, at least one of said chuck jaw mounting means being adjustably connected to said way means so that it may be moved arcuately of said body; and a plurality of chuck jaws connected to said mounting means, at least one of said jaws having means thereupon for determining the spatial and chordal relationship of said jaw's work-engaging surface with respect to the center of said body.

8. In a chuck adapted to be utilized in conjunction with a machine tool, the combination of: a tubular body, having in its bore way means thereupon; chuck jaw mounting means operatively connected to said body, at least one of said chuck jaw mounting means being adjustably connected to said way means so that it may be moved on said body; and a plurality of chuck jaws connected to said mounting means, at least one of said jaws having means thereupon for determining the spatial relationship of said jaw's work-engaging surface with respect to the center of said body, said means for determining the spatial relationship of said work-engaging surface being constituted by micrometer adjustment means on said jaw.

9. In a chuck for use in forming openings in eccentric relationship to the workpiece in which they are formed, the combination of: a cylindrical tubular body having a key way therein extending circumferentially in the bore of said body; chuck jaw mounting means operatively connected to said body through said key way, at least one of said chuck jaw mounting means incorporating adjustment means for adjusting the position of said mounting means in said key way; and a plurality of chuck jaws mounted on said body adjacent said key way, at least one of said jaws being secured to said mounting means incorporating said adjustment means to permit the location of said one jaw at a desired point along said key way.

10. In a chuck for use in forming openings in eccentric relationship to the workpiece in which they are formed, the combination of: a cupped body having a key way therein extending circumferentially in the cupped cavity of said body; chuck jaw mounting means operatively connected to said body through said key way, at least one of said chuck jaw mounting means incorporating adjustment means for adjusting the position of said mounting means in said key way; and a plurality of chuck jaws mounted on said body adjacent said key way, at least one of said jaws being secured to said mounting means incorporating said adjustment means to permit the location of said one jaw at a desired point along said key way, at least one of said jaws incorporating tubular spacer means for determining the spatial relationship between said jaw's work-engaging surface and the center of said body.

11. In a chuck for use in forming openings in eccentric relationship to the workpiece in which they are formed, the combination of: a tubular cupped body having a key way therein extending circumferentially in the bore of said body; chuck jaw mounting means operatively connected to said body through said key way, at least one of said chuck jaw mounting means incorporating adjustment means for adjusting the position of said mounting means in said key way; and a plurality of chuck jaws mounted on said body adjacent said key way, at least one of said jaws being secured to said mounting means incorporating said adjustment means to permit the location of said one jaw at a desired point along said key way, at least one of said jaws incorporating means for determining the spatial relationship between said jaw's work-engaging surface and the center of said body, said means for determining the spatial relationship between said one jaw's work-engaging surface and the center of said body including micrometer adjustment means for adjusting said work-engaging surface toward or away from said center.

12. In a chuck for use in forming openings in eccentric relationship to the workpiece in which they are formed, the combination of: a tubular body having a key way therein extending circumferentially in the bore of said body; chuck jaw mounting means operatively connected to said body through said key way, at least one of said chuck jaw mounting means incorporating adjustment means for adjusting the position of said mounting means in said key way; and a plurality of chuck jaws mounted on said body adjacent said key way, at least one of said jaws being secured to said mounting means incorporating said adjustment means to permit the location of said one jaw at a desired point along said key way, at least one of said jaws incorporating means for determining the spatial relationship between said jaw's work-engaging surface and the center of said body, said means for determining said spatial relationship including a tubular spacer operatively connected to said jaw.

13. A chuck for forming eccentrically located openings in a workpiece, the combination of: a tubular body; and chuck jaw means operatively connected to the bore of said body, at least one of which is adjustable circumferentially of said body and incorporates means for determining the spatial relationship of the work-engaging surface thereof in reference to the center of said body, said chuck jaw means including at least one jaw incorporating an angularly deflectable work-engaging surface to permit said work-engaging surface to accommodate a corresponding surface of a workpiece.

14. In a chuck jaw adapted to be utilized in conjunction with a tubular chuck body, the combination of: adjustment means for securing said jaw in a desired location in the bore of said body; a work-engaging surface on said chuck jaw; and means for determining the spatial relationship of said work-engaging surface with respect to the center of said body, said spatial relationship determining means including spacer means and a micrometer adjustment interposed between said work-engaging surface and said adjustment means.

15. In a chuck jaw adapted to be utilized in conjunction with a tubular chuck body, the combination of: adjustment means for securing said jaw in a desired location in the bore of said body; a work-engaging surface on said chuck jaw; and means for determining the spatial relationship of said working surface with respect to the center of said body, said spatial relationship determining means being constituted by cylindrical spacer block demountably secured to said adjust means.

16. In a chuck, the combination of a tubular body having in the bore thereof circumferentially extending way means, a radially adjustable clamping jaw in the bore of said body, a plurality of circumferentially adjustable shoes carried by said way means and having chordal surfaces, workpiece supporting blocks, and spacers of predetermined lengths interposed between said chordal surfaces and said blocks to radially locate said blocks, said blocks being adjustable to different positions located parallel to said chordal surfaces.

17. The combination according to claim 16 comprising means for securing said blocks in different selected chordal positions and said shoes in different selected circumferential positions.

18. In a chuck, the combination of a tubular body, radially adjustable jaw means in the bore of said body, said body having in the bore thereof circumferential way means, and a plurality of circumferentially adjustable workpiece supporting shoes of cylindrical segment shape carried by said way means and fitting against the surface of said bore.

19. In a chuck, the combination of a tubular body, radially adjustable jaw means located in radial positions through the wall of said body, said body having in the bore thereof circumferentially extending way means, and a plurality of cylindrical sector shaped workpiece supporting shoes circumferentially adjustable along said way means.

20. The combination according to claim 19 wherein said shoes have chordal plane surfaces for supporting a workpiece, said jaw means being effective to hold said workpiece on said shoes.

References Cited

UNITED STATES PATENTS

| | | | |
|---|---|---|---|
| 1,125,650 | 1/1915 | Carr | 279—6 |
| 1,405,325 | 1/1922 | Posch | 269—270 X |
| 2,757,008 | 7/1956 | Lane | 279—110 |
| 2,861,471 | 11/1958 | Kronenberg | 74—573 |
| 3,031,201 | 4/1962 | Neef | 279—123 X |
| 3,041,079 | 6/1962 | Garrison | 279—123 X |

FOREIGN PATENTS 20,721    11/1945    Finland.

LESTER M. SWINGLE, *Primary Examiner.*

JAMES F. McKEOWN, *Assistant Examiner.*

U.S. Cl. X.R.

82—45; 269—139, 156, 270; 279—1, 123